United States Patent [19]

Durbin et al.

[11] Patent Number: 4,493,919

[45] Date of Patent: * Jan. 15, 1985

[54] POLYMER BLEND COMPOSITION COMPRISING TWO BLOCK POLYMERS A VINYL AROMATIC COPOLYMER AND A POLYESTER

[75] Inventors: Daniel P. Durbin, Sugarland; Robert G. Lutz, Spring; Richard L. Danforth, Missouri City, all of Tex.

[73] Assignee: Shell Oil Company, Houston, Tex.

[*] Notice: The portion of the term of this patent subsequent to Mar. 22, 2000 has been disclaimed.

[21] Appl. No.: 502,407

[22] Filed: Jun. 8, 1983

[51] Int. Cl.$^3$ .............................................. C08L 53/02
[52] U.S. Cl. ...................................... 524/505; 525/89; 525/92; 525/93
[58] Field of Search .................... 525/89, 92; 524/505

[56] References Cited

U.S. PATENT DOCUMENTS

| | | | |
|---|---|---|---|
| 4,090,996 | 5/1978 | Gergen et al. | 525/92 |
| 4,220,735 | 9/1980 | Dieck et al. | 525/89 |
| 4,243,766 | 1/1981 | Abolins et al. | 525/92 |
| 4,267,286 | 5/1981 | Campbell | 525/92 |
| 4,277,575 | 7/1981 | Haaf et al. | 525/89 |
| 4,377,647 | 3/1983 | Durbin et al. | 525/92 |

*Primary Examiner*—Wilbert J. Briggs, Sr.
*Attorney, Agent, or Firm*—Peter A. Bielinski

[57] ABSTRACT

A thermoplastic molding composition having good low temperature properties in addition to low distortion at paint bake temperatures comprises the blend of a selectively hydrogenated monoalkenyl arene-conjugated diene block copolymer, a vinyl aromatic-$\alpha$, $\beta$-unsaturated cyclic anhydride copolymer, and a thermoplastic polyester.

9 Claims, No Drawings

POLYMER BLEND COMPOSITION COMPRISING TWO BLOCK POLYMERS A VINYL AROMATIC COPOLYMER AND A POLYESTER

BACKGROUND OF THE INVENTION

1. Field of the Invention

This invention relates to a polymer blend composition. More particularly, this invention relates to a polymer blend composition comprising a selectively hydrogenated block copolymer, a vinyl aromatic copolymer, a thermoplastic polyester and a saturated diblock copolymer.

2. Description of the Prior Art

Vinyl aromatic resins, such as polystyrene or high impact polystyrene have been found to be useful in thermoplastic molding compositions. However, such vinyl aromatic resins have poor heat distortion and impact resistance. One approach to improve these property deficiencies involves copolymerizing the vinyl aromatic with an $\alpha, \beta$-unsaturated cyclic anhydride, to form copolymers such as poly(styrene-maleic anhydride). Although such copolymers have improved heat resistance, the overall balance of properties is still inadequate.

In order to further improve the properties of such vinyl aromatic copolymers, various other polymers have been blended with the copolymer. For example, blends of nitrile rubber and styrene-maleic anhydride copolymers are disclosed in U.S. Pat. Nos. 2,914,505 and 3,641,212. Blends of styrene-maleic anhydride copolymers with radial styrene-diene block copolymers and an optional polyphenylene ether resin are disclosed in U.S. Pat. No. 4,097,550. Still further, blends of styrene-maleic anhydride copolymers, hydrogenated styrene-diene block copolymers and optional polyphenylene ether resins are disclosed in U.S. Pat. Nos. 4,124,654 and 4,243,766. Such polymer blend compositions are still not ideal.

Blends of styrene-maleic anhydride copolymers, hydrogenated styrene-diene-styrene copolymers and thermoplastic polyesters disclosed in U.S. Pat. No. 4,377,647 show good properties especially when blended with oils. However, this oil can haze into the surface of painted parts made from the material.

SUMMARY OF THE INVENTION

The present invention is directed to a polymer blend composition having an unobvious balance of properties. In particular, the present invention is a thermoplastic molding composition comprising:

(a) from about 10 to about 85 percent by weight of a selectively hydrogenated block copolymer comprising at least two monoalkenyl arene polymer end blocks A and at least one substantially completely hydrogenated conjugated diene polymer mid block B, the weight percent of blocks A comprising between 8 and 65 percent by weight of said block copolymer;

(b) from about 10 to about 80 percent by weight of a vinyl aromatic copolymer comprising a vinyl aromatic compound and an $\alpha, \beta$-unsaturated cyclic anhydride; and (c) from about 10 to about 80 percent by weight of a thermoplastic polyester having a molecular weight in excess of about 20,000, a melting point over about 120° C., and which polyester is selected from the group consisting of a condensation product of a dicarboxylic acid and a glycol, polypivalolactone and polycaprolactone;

(d) from about 1 to about 50 percent by weight of a hydrogenated diblock copolymer comprising a monoalkenyl arene polymer and a hydrogenated conjugated diene polymer.

The composition according to the invention are not only readily processable into parts, but possess good low temperature ($-20°$ F.) properties, and are also directly paintable with commercial paints and have low distortion during the paint bake cycle (250° F., 30 minutes). Further, these compositions have excellent gloss, making them prime candidates for exterior automotive applications. It is significant that the compositions according to the invention are also less expensive than competitive materials in exterior automotive parts. Still further, as shown in the Illustrative Embodiments which follow, the impact/stiffness relationship shows unexpectedly that it is possible to obtain good stiffness without the incorporation of oil.

Significant improvements in surface scuff and mar resistance have also been found in the compositions of the present invention.

DETAILED DESCRIPTION OF THE INVENTION

There are four major components in the polymer compositions of the present invention—a selectively hydrogenated block copolymer component, a vinyl aromatic copolymer component, a thermoplastic polyester component and a saturated diblock copolymer component.

A. Selectively Hydrogenated Block Copolymer

The block copolymers employed in the present invention may have a variety of geometrical structures, since the invention does not depend on any specific geometrical structure, but rather upon the chemical constitution of each of the polymer blocks. Thus, the structures may be linear, radial or branched so long as each copolymer has at least two polymer end blocks A and at least one polymer mid block B as defined above. Methods for the preparation of such polymers are known in the art. Particular reference will be made to the use of lithium based catalysts and especially lithium-alkyls for the preparation of the precursor polymers (polymers before hydrogenation). U.S. Pat. No. 3,595,942 not only describes some of the polymers of the instant invention but also describes suitable methods for their hydrogenation. The structure of the polymers is determined by their methods of polymerization. For example, linear polymers result by sequential introduction of the desired monomers into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the precursor polymers of three or more. Coupling may be effected with multifunctional coupling agents such as dihaloalkanes or -alkenes and divinyl benzene as well as certain polar compounds such as silicon halides, siloxanes or esters of monohydric alcohols with carboxylic acids. The presence of any coupling residues in the polymer may be ignored for an adequate description of the polymers forming a part of the composition of this invention. Likewise, in the generic sense, the specific structures also may be ignored. The invention applies especially to the use of selectively hydrogenated polymers having the configuration before hydrogenation of the following typical species:
polystyrene-polybutadiene-polystyrene(SBS)
polystyrene-polyisoprene-polystyrene (SIS)
poly(alpha-methylstyrene)-polybutadiene-poly(alpha-methylstyrene) and
poly(alpha-methylstyrene)-polyisoprene-poly(alpha-methylstyrene).

It will be understood that both blocks A and B may be either homopolymer or random copolymer blocks as long as each block predominates in at least one class of the monomers characterizing the blocks and as long as the A blocks individually predominate in monoalkenyl arenes and the B blocks individually predominate in dienes. The term "monoalkenyl arene" will be taken to include especially styrene and its analogs and homologs including alpha-methylstyrene and ring-substituted styrenes, particularly ring-methylated styrenes. The preferred monoalkenyl arenes are styrene and alpha-methylstyrene, and styrene is particularly preferred. The blocks B may comprise homopolymers of butadiene or isoprene and copolymers of one or both of these two dienes with a monoalkenyl arene as long as the blocks B predominate in conjugated diene units. When the monomer employed is butadiene, it is preferred that between about 35 and about 55 mol percent of the condensed butadiene units in the butadiene polymer block have 1,2 configuration. Thus, when such a block is hydrogenated, the resulting product is, or resembles, a regular copolymer block of ethylene and butene-1 (EB). If the conjugated diene employed is isoprene, the resulting hydrogenated product is or resembles a regular copolymer block of ethylene and propylene (EP).

Hydrogenation of the precursor block copolymers is preferably effected by use of a catalyst comprising the reaction products of an aluminum alkyl compound with nickel or cobalt carboxylates or alkoxides under such conditions as to substantially completely hydrogenate at least 80% of the aliphatic double bonds while hydrogenating no more than about 25% of the alkenyl arene aromatic double bonds. Preferred block copolymers are those where at least 99% of the aliphatic double bonds are hydrogenated while less than 5% of the aromatic double bonds are hydrogenated.

The average molecular weights of the individual blocks may vary within certain limits. In most instances, the monoalkenyl arene blocks will have number average molecular weights in the order of 5,000-125,000, preferably 7,000-60,000 while the conjugated diene blocks either before or after hydrogenation will have average molecular weights in the order of 10,000-300,000, preferably 30,000-150,000. The total average molecular weight of the block copolymer is typically in the order of 25,000 to about 250,000, preferably from about 35,000 to about 200,000. These molecular weights are most accurately determined by tritium counting methods or osmotic pressure measurements.

The proportion of the monoalkenyl arene blocks should be between about 8 and 65% by weight of the block copolymer, preferably between about 10 and 30% by weight.

While the average molecular weight of the individual blocks is not critical, at least within the above specified limits, it is useful to select the type and total molecular weight of the block copolymer in order to obtain the necessary mixing under the chosen blending conditions.

Best results are obtained when the viscosity of the block copolymer and the other thermoplastic resins are substantially the same at the temperature used for blending and processing. In some instances, matching of the viscosity of the block copolymer portion and the resin portions are best achieved by using two or more block copolymers or resins. For example, a blend of two block copolymers having different molecular weights or a blend of a hydrogenated SBS and hydrogenated SIS polymers may be employed.

B. Vinylaromatic Copolymer

The copolymers of the vinyl aromatic compounds and the α, β-unsaturated cyclic anhydride are well known and are described in the literature. The vinyl aromatic component may be derived from compounds of the formula:

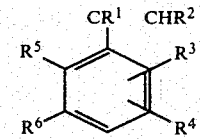

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl groups. These compounds are free of any substituent that has a tertiary carbon atom. Styrene is the preferred vinyl aromatic compound. The α, β-unsaturated cyclic anhydrides include maleic anhydride, citraconic anhydride, itaconic anhydride, aconitic anhydride and the like. The preferred α, β-unsaturated cyclic anhydride is maleic anhydride.

These polymers may comprise 40 to 1 mole percent of the α, β-unsaturated cyclic anhydride and from 60 to 99 mole percent of a vinyl aromatic compound. The preferred polymers will contain about 25-5 mole percent of the α, β-unsaturated cyclic anhydride and 75-95 mole percent of the vinyl aromatic compound. The preparation of these copolymers are described in U.S. Pat. Nos. 2,971,939; 3,336,267 and 2,769,804 which are hereby incorporated by reference. A much preferred copolymer is ARCO's Dylark ® 332 styrene-maleic anhydride copolymer, which is a styrene-maleic anhydride copolymer containing about 8 mole % maleic anhydride, the balance being styrene.

C. Thermoplastic Polyesters

The thermoplastic polyesters employed in the instant invention have a generally crystalline structure, a melting point over about 120° C., and are thermoplastic as opposed to thermosetting.

One particularly useful group of polyesters are those thermoplastic polyesters prepared by condensing a dicarboxylic acid or the lower alkyl ester, acid halide, or anhydride derivatives thereof with a glycol, according to methods well-known in the art.

Among the aromatic and aliphatic dicarboxylic acids suitable for preparing polyesters useful in the present invention are oxalic acid, malonic acid, succinic acid, glutaric acid, adipic acid, suberic acid, azelaic acid, sebacic acid, terephthalic acid, isophthalic acid, p-carboxypheroacetic acid, p,p'-dicarboxydiphenyl, p,p'-dicarboxydiphenyl, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, p-carboxyphenoxyhexanoic acid, p,p'-dicarboxydiphenylmethane, p,p-dicarboxydiphenylpropane, p,p'-dicarboxydiphenyloctane, 3-alkyl-4-(β-carboxethoxy)-benzoic acid, 2,6-naphthalene dicarboxylic acid, 2,7-napthalene dicarboxylic acid, and the like. Mixtures of dicarboxylic acids can also be employed. Terephthalic acid is particularly preferred.

The glycols suitable for preparing the polyesters useful in the present invention include straight chain alkylene glycols of 2 to 12 carbon atoms such as ethylene glycol, 1,3-propylene glycol, 1,6-hexylene glycol, 1,10-decamethylene glycol, 1,12-dodecamethylene glycol and the like. Aromatic glycols can be substituted in whole or in part. Suitable aromatic dihydroxy compounds include p-xylylene glycol, pyrocatechol, resorcinol, hydroquinone, or alkyl-substituted derivatives of these compounds. Another suitable glycol is 1,4-cyclohexane dimethanol. Much preferred glycols are the straight chain alkylene glycols having 2 to 4 carbon atoms.

A preferred group of polyesters are poly(ethylene terephthalate), poly(propylene terephthalate), and poly(butylene terephthalate). A much preferred polyester is poly(butylene terephthalate). Poly(butylene terephthalate), a crystalline copolymer, may be formed by the poly-condensation of 1,4-butanediol and dimethyl-terephthalate or terephthalic acid, and has the generalized formula:

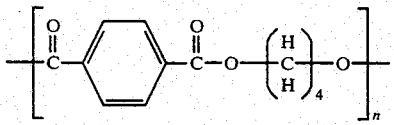

where n varies from 70 to 140. The molecular weight of the poly(butylene terephthalate) typically varies from about 20,000 to about 25,000. A suitable process for manufacturing the polymer is disclosed in British Pat. No. 1,305,130.

Commercially available poly(butylene terephthalate) is available from General Electric under the tradename VALOX ® thermoplastic polyester. Other commercial polymers include CELANEX ® from Celanese, TENITE ® from Eastman Kodak, and VITUF ® from Goodyear Chemical.

Another useful polyester is polypivalolactone. Polypivalolactone is a linear polymer having recurring ester structural units mainly of the formula:

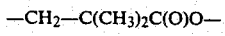

i.e., units derived from pivalolactone. Preferably the polyester is a pivalolactone homopolymer. Also included, however, are the copolymers of pivalolactone with not more than 50 mole percent, preferably to more than 10 mole percent of other beta-propiolactones, such as beta-propiolactone, alpha, alpha-diethyl-beta-propiolactone and alpha-methyl-alpha-ethyl-beta-propiolactone. The term "beta-propiolactones" refers to beta-propiolactone (2-oxetanone) and to derivatives thereof which carry no substitutes at the beta-carbon atoms of the lactone ring. Preferred beta-propiolactones are those containing a tertiary or quaternary carbon atom in the alpha position relative to the carbonyl group. Especially preferred are the alpha, alpha-dialkyl-beta-propiolactones wherein each of the alkyl groups independently has from one to four carbon atoms. Examples of useful monomers are:
alpha-ethyl-alpha-methyl-beta-propiolactone,
alpha-methyl-alpha-isopropyl-beta-propiolactone,
alpha-ethyl-alpha-n-butyl-beta-propiolactone,
alpha-chloromethyl-alpha-methyl-beta-propiolactone,
alpha, alpha-bis(chloromethyl)-beta-propiolactone, and
alpha, alpha-dimethyl-beta-propiolactone (pivalolactone).

See generally U.S. Pat. Nos. 3,259,607; 3,299,171; and 3,579,489. These polypivalolactones have a molecular weight in excess of 20,000 and a melting point in excess of 120° C.

Another useful polyester is polycaprolactone. Typical poly(ε-caprolactones) are substantially linear polymers in which the repeating unit is

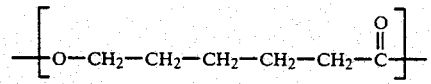

These polymers have similar properties to the polypivalolactones and may be prepared by a similar polymerization mechanism. See generally U.S. Pat. No. 3,259,607.

Saturated diblock copolymers useful in the present invention are referred to as (A-B)$_n$ type in which A represents a block of the group consisting of styrene polymer blocks or hydrogenated products thereof while B represents a polymer block of the groups consisting of alpha olefin polymers, conjugated diene polymers, and hydrogenated conjugated diene polymer blocks and n is an integer between 1 and 25. In the latter case at least about 50% of the original olefinic double bonds have been reduced by hydrogenation. The present invention furthermore contemplates the average molecular weight limitations of each of these blocks, block A being limited to average molecular weights between about 5,000 and 50,000 (preferably 9,000 and 35,000) which B is limited to average molecular weights between about 10,000 and 1,000,000 (preferably 15,000 and 200,000). Thus typical block copolymers are polystyrene-polyisoprene, polystyrene-polybutadiene, polystyrene-polyethylene, polystyrene-ethylene-propylene copolymer, polystyrene-ethylene-buryle ne copolymer, polyvinylcyclohexane-hydrogenated polyisoprene, polyvinylcyclohexane-hydrogenated polybutadiene.

The conjugated dienes which may be employed in forming the block polymers to be later hydrogenated include especially butadiene and isoprene as well as mixtures thereof. If block copolymers are formed incorporating alpha olefin blocks as the blocks B, the preferred species include ethylene propylene, and butylene, and mixtures thereof.

The blocks A and B may be either homopolymer or copolymer blocks. A typical polymer of this type prior to hydrogenation will have the structure polystyrene SBR.

The block copolymers are hydrogenated to reduce their olefinic unsaturation by at least 50% and preferably at least 80% of the original olefinic double bonds. Hydrogenation is preferably carried out in solution utilizing either homogeneous or heterogeneous catalysts. Preferably, the more readily saturated olefinic double bonds are reduced at relatively mild hydrogenation conditions or by the use of a hydrogenation catalyst selective to the olefinic double bonds.

Catalysts such as cobalt or nickel salts or alkoxides reduced with aluminum alkyl compounds preferably are employed as catalysts. Suitable catalysts include nickel acetate, nickel octoate, or nickel acetyl acetonate reduced with aluminum alkyl compounds such as aluminum triethyl or aluminum triisobutyl.

U.S. Pat. Nos. 4,036,910 and 3,763,044 disclose styrene-alphaolefin polymers which may be used in the compositions of the present invention and are hereby incorporated by reference.

D. Additional Components

The polymer blends of the instant invention may be compounded further with other polymers, oils, fillers, reinforcements, antioxidants, stabilizers, fire retardants, antiblocking agents and other rubber and plastic compounding ingredients without department from the scope of this invention.

Examples of various fillers that can be employed are in the 1971-1972 Modern Plastics Encyclopedia, pages 240-247. Reinforcements are also very useful in the present polymer blends. A reinforcement may be defined simply as the material that is added to a resinous matrix to improve the strength of the polymer. Most of these reinforcing materials are inorganic or organic products of high molecular weight. Various examples include glass fibers asbestos, boron fibers, carbon and graphite fibers, whiskers, quartz and silica fibers, ceramic fibers, metal fibers natural organic fibers, and synthetic organic fibers. Especially preferred are reinforced polymer blends of the instant invention containing about 2 to about 80 percent by weight based on the total weight of the resulting reinforced blend.

E. Mixing Conditions

The relative proportions of the polymers are presented below in percent by weight:

|  | Preferred | More Preferred |
|---|---|---|
| Selectively hydrogenated block copolymer | 10 to 85 | 30 to 70 |
| Vinyl aromatic copolymer | 10 to 80 | 15 to 40 |
| Thermoplastic polyester | 10 to 80 | 15 to 40 |
| Hydrocarbon oil | 0 to 50 | 1 to 10 |
| Hydrogenated diblock copolymer | 1 to 50 | 5 to 20 |

The blending of the various polymer components may be done in any manner that produces a blend which will not delaminate on processing. For example, the various polymers may be dissolved in a solvent common for all and coagulated by admixing in a solvent in which none of the polymers are soluble. But more preferably, a particularly useful procedure is to intimately mix the polymers in the form of granules and/or powder in a high shear mixer. Intimate mixing is typically achieved by employing high shear extrusion compounding machines such as twin screw compounding extruders and thermoplastic extruders having at least a 20:1 L/D ratio and a compression ratio of 3 or 4:1.

The mixing or processing temperature (Tp) is selected in accordance with the particular polymers to be blended. For example, when melt blending the polymers instead of solution blending, it will be necessary to select a processing temperature above the melting point of the highest melting point polymer. In addition, the processing temperature may also be chosen so as to permit the isoviscous mixing of the polymers. Typically, the mixing or processing temperature is between about 200° C. and about 350° C. For blends containing poly(butylene terephthalate) Tp is preferably between about 240° C. and about 300° C.

The polymer blends of the instant invention can be employed in any use typically performed by engineering thermoplastics, such as metal replacement and those areas where high performance is necessary. A particularly useful end use area is for exterior decorated automotive applications.

To illustrate the instant invention, the following illustrative embodiments are given. It is to be understood, however, that the embodiments are given for the purpose of illustration only and the invention is not to be regarded as limited to any of the specific materials or conditions used in the specific embodiments.

The physical test methods used in evaluation of the blends appearing in the Table are as follows:
—20° F. Cold Impact Strength—Gardner Impact Test
Stiffness—Tinius Olsen Stiffness Test, ASTM D-747

Illustrative Embodiments

In the Illustrative Embodiments, various polymer blends were prepared. 3206 and 3289 are according to the invention. All blends were prepared by first dry blending the various component particles, and then extruding the resulting mixture in a Werner-Pflederer extruder at a temperature above about 465° F.

The three block copolymer components are selectively hydrogenated SBS block copolymers, which polymers are according to the invention and which vary in molecular weight and percent styrene. SMA is Dylark® 332, a styrene-maleic anhydride copolymer. Some of the blends contain a hydrocarbon rubber extending oil. All blends contain a standard antioxidant. The various formulations and resulting properties are presented below in the Table. As shown in the table, blends of block copolymer, vinyl aromatic copolymer and PBT resin (Blends: 2714 and 2744) possessed reasonable cold impact strength at high stiffness. Cold impact and stiffness are typically inversely related. What was desired was to increase the impact/stiffness product which would result in a stiffer composition with improved impact strength.

The addition of oil (Blends 2745, 2746, 2784, 2785 and 2786) produced an obvious improvement in the cold impact/stiffness relationship. However, it is well known that oil can haze onto the surface of a painted part produced from the oiled material. Surface scuff and mar resistance were also identified as problems with painted and unpainted materials produced from the oiled material.

Blends 3206 and 3289 according to the present invention illustrate the high impact strength and high stiffness obtained without the use of oil by incorporating a styrene-isoprene diblock copolymer. These blends also showed significant improvements in surface scuff and mar resistance and do not show signs of hazing as in the oiled blends.

TABLE

| | 2714 | 2744 | 2745 | 2746 | 2784 | 2785 | 2786 | 3206 | 3289 |
|---|---|---|---|---|---|---|---|---|---|
| Formulation (percent by weight) | | | | | | | | | |
| Block Copolymer #1 | 36 | 60 | 58.2 | 57 | 54 | 66.6 | 47.6 | — | 12 |
| Block Copolymer #2 | 24 | — | — | — | — | — | — | — | 28 |
| Block Copolymer #3 | — | — | — | — | — | — | — | 40 | — |
| SMA | 20 | 20 | 19.4 | 19 | 18 | 14.2 | 23.8 | 25 | 25 |
| PBT | 20 | 20 | 19.4 | 19 | 18 | 14.2 | 23.8 | 25 | 25 |
| Oil | — | — | 3.0 | 5 | 10 | 5 | 5 | — | — |
| Diblock Copolymer | — | — | — | — | — | — | — | 10 | 10 |
| Properties | | | | | | | | | |
| −20° F. Cold Impact Strength (ft-lbs/in) | 84 | 83 | 128 | 178 | 164 | 166 | 178 | 160 | 137 |
| Stiffness (psi/rad) | 26,415 | 21,568 | 20,092 | 16,803 | 12,164 | 10,851 | 24,140 | 28,273 | 41,040 |

What is claimed is:

1. A thermoplastic molding composition comprising:
   (a) from about 10 to about 85 percent by weight of a selectively hydrogenated block copolymer comprising at least two monoalkenyl arene polymer end blocks A and at least one substantially completely hydrogenated conjugated diene polymer mid block B, the weight percent of blocks A comprising between 8 and 65 percent by weight of said block copolymers wherein at least 80% of the aliphatic double bonds in block B are hydrogenated and no more than about 25% of the alkenyl aromatic double bonds in block A are hydrogenated;
   (b) from about 10 to about 80 percent by weight of a vinyl aromatic copolymer comprising a vinyl aromatic compound and an α, β-unsaturated cyclic anhydride; and
   (c) from about 10 to about 80 percent by weight of a thermoplastic polyester having a molecular weight in excess of about 20,000, a melting point over about 120° C., and which polyester is selected from the he group consisting of a condensation product of a dicarboxylic acid and a glycol, polypivalolactone and polycaprolactone;
   (d) from about 1 to about 50 percent by weight of a hydrogenated diblock copolymer comprising a monoalkenyl arene polymer and a hydrogenated conjugated diene polymer.

2. The composition of claim 1 wherein said selectively hydrogenated block copolymer is a linear ABA block copolymer.

3. The composition of claim 1 wherein said selectively hydrogenated block copolymer is a coupled or radial (AB)$_x$ BA block copolymer.

4. The composition of claim 1 or claim 2 wherein said vinyl aromatic copolymer is a styrene-maleic anhydride copolymer.

5. The composition of claim 1 wherein said thermoplastic polyester is prepared by condensing a dicarboxylic acid with a glycol.

6. The composition of claim 5 wherein said thermoplastic polyester is poly(butylene terephthalate).

7. The composition of claim 4 wherein said thermoplastic polyester is poly(butylene terephthalate).

8. The composition according to claim 1 also containing 0 to 30 percent by weight of a hydrocarbon extending oil.

9. The composition according to claim 8 wherein the relative amounts of each component are:
   (a) about 30 to about 70 weight percent block copolymer,
   (b) about 15 to about 40 weight percent vinyl aromatic copolymer,
   (c) about 15 to about 40 weight percent thermoplastic polyester, and
   (d) about 5 to about 20 weight percent diblock copolymer.

* * * * *